UNITED STATES PATENT OFFICE 2,595,017

BIS-β-AROMATIC SULFONHYDRAZIDES

Joseph A. Sprung and Willy A. Schmidt, Easton, Pa., assignors to General Aniline & Film Corporation, New York, N. Y., a corporation of Delaware No Drawing. Application December 28, 1949, Serial No. 135,526

6 Claims. (Cl. 260—509)

The present invention relates to bis-β-aromatic sulfon-hydrazides in which the terminal radical attached to the β-nitrogen atom is aromatic, said compounds being particularly useful in the production of cyan azo dyestuffs.

Many proposals have been made in the photographic art dealing with the preparation of dyestuff images. One of the classical methods involves the development of an exposed silver halide emulsion with a primary aromatic amino developer in the presence of a color former which reacts with the oxidation products of the developer to produce a dyestuff image in situ with the silver image formed in the development of the emulsion. The color formers generally employed contain either a phenolic hydroxyl group or a reactive methylene group and upon reaction with the oxidation products of a primary aromatic amino developer lead to dyestuffs of the quinonimine and azomethine class. These dyestuffs leave something to be desired, particularly from the standpoint of their stability to light, acids, alkalies, and the like.

It is known that the azo dyes are much more stable than the aforesaid dyes and proposals have been made to utilize the same in the formation of dyestuff images in photography. The method most generally employed is that known as the silver dye bleach-out method which involves the treatment of a diffusely dyed silver halide emulsion containing a silver image with a bleaching bath which destroys the dyestuff in cooperation with the silver image. This method, however, is disadvantageous from the standpoint of the fact that it cannot be used with taking film since the colored emulsion layers act as filters. The process is therefore generally confined to the production of colored prints where the exposure may be regulated at will. The art has accordingly been assiduously seeking a method which would enable the production of azo dyestuff images in photography while avoiding the objections inherent in the silver dye bleachout method.

In our co-pending application Serial No. 574,810, filed January 26, 1945, now U. S. Patent 2,424,256, of which the present application is in part a continuation, we have disclosed the preparation of azo dyestuff images in color photography by developing an exposed silver halide emulsion with a β-aromatic sulfonhydrazide in the presence of an azo dye coupling component. By this method there is produced in situ with the silver image an azo dyestuff image. The principle on which this process is based is the discovery that β-aromatic sulfonhydrazides in the presence of a mild oxidizing agent such as that supplied by a latent silver image are converted into diazo sulfones which react with the usual azo dyestuff components yielding azo dyes. It is pointed out in the prior application that the β-aromatic sulfonhydrazides which yield best results are those in which the aromatic radical linked to the β-nitrogen atom is substituted by a group more electropositive than hydrogen, such as an alkoxy, amino, or substituted amino group and the like. The diazo sulfones obtained from such sulfonhydrazides undergo coupling reactions similar to that of the corresponding diazonium salts. On the other hand, the β-aromatic sulfonhydrazides which contain in the aryl ring attached to the β-nitrogen atom an electronegative substituent such as a nitro, carboxy, sulfo group or the like, yield on oxidation, diazo sulfones which are quite reluctant to couple with azo dye components.

The most important image in subtractive color photography is the cyan image, which is often typified as the key image. The importance of accurately controlling the color of this image has been dealt with in the prior art, and in this connection attention is directed to USP 2,313,138, granted March 9, 1943, USP 2,324,832, granted July 20, 1943, and USP 2,357,394, granted September 5, 1944.

It has been ascertained that cyan azo dye images meeting the requirements of the art can be produced by utilizing for the color development of such images bis-β-aromatic sulfonhydrazides, and particularly those in which the aromatic rings linked to the β-nitrogen atoms are substituted by an electropositive group. Such compounds are basically new and such compounds constitute the purposes and objects of the present invention.

The bis-β-aromatic sulfonhydrazides contemplated herein are represented by the following structural formula:

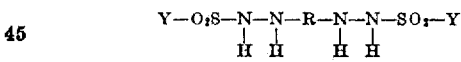

in which the Y's are alike and are lower alkyl, i. e., methyl, ethyl, propyl, butyl, or amyl, or are a phenyl radical, i. e., aminophenyl, acylaminophenyl, i. e., acetylaminophenyl, propoylaminophenyl, benzoylaminophenyl, and the like, lower alkoxyphenyl, i. e., methoxyphenyl, ethoxyphenyl, propoxyphenyl, or the like, sulfo lower alkoxyphenyl, i. e., sulfomethoxyphenyl, β-sulfoethoxyphenyl, and the like, and R is a divalent aromatic radical such as

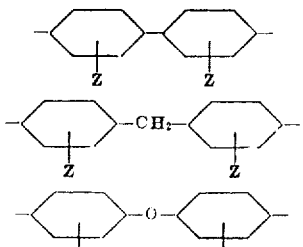

and

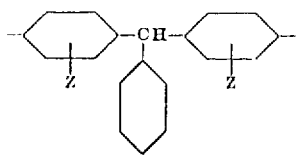

in which the Z's are alike and are hydrogen or lower alkoxy as above.

Examples of compounds falling within the above classification are the following:

1. β,β'-(3,3'- diethoxy- 4,4'- biphenylene)- bis- p-acetamidobenzenesulfonhydrazide.

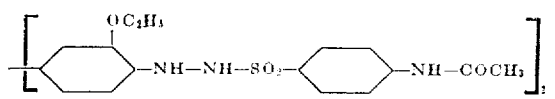

2. β,β'- Di[4- (β''- sulfoethoxy)- benzenesulfonyl] 3,3' - dimethoxy - 4,4' - biphenylenedihydrazine (disodium salt).

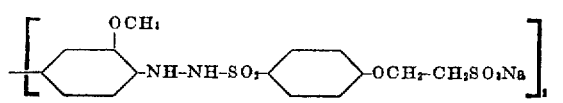

3. β,β'-Di(4- aminobenzenesulfonyl)-3,3'-dimethoxy-4,4'-biphenylene-hydrazine.

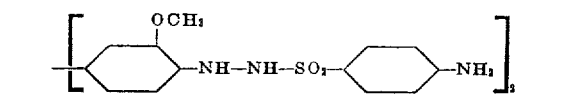

4. β,β'- Di(4- acetamidobenzenesulfonyl)- 3,3'-dimethoxy-4,4'-biphenylenedihydrazine.

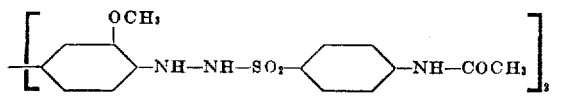

5. β,β'-Di(4-ethoxybenzenesulfonyl)-3,3'-dimethoxy-4,4'-biphenylene-dihydrazine.

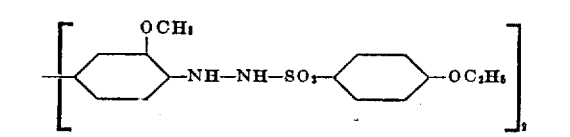

6. β,β'- Di(4- acetamidobenzenesulfonyl)- 3,3- dihydrazino diphenylmethane.

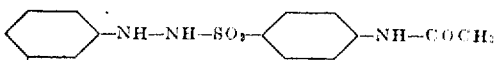

7. β,β'-Di[4-(β''- sulfoethoxy)- benzenesulfonyl]-4,4'-dihydrazino diphenylmethane (disodium salt).

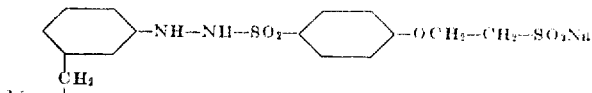

8. β,β'- Di[4-(β''- sulfoethoxy)- benzenesulfonyl] 3,3'-dimethoxy-4,4'-dihydrazino-diphenylmethane (disodium salt).

9. β,β'-Di-(4- acetamidobenzenesulfonyl)-4,4'-dihydrazino diphenylmethane.

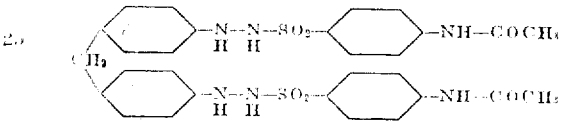

10. β,β'- Di - (4- acetamidobenzenesulfonyl)- 4,4'-dihydrazino-2,2',5,5'- tetramethoxy- triphenylmethane.

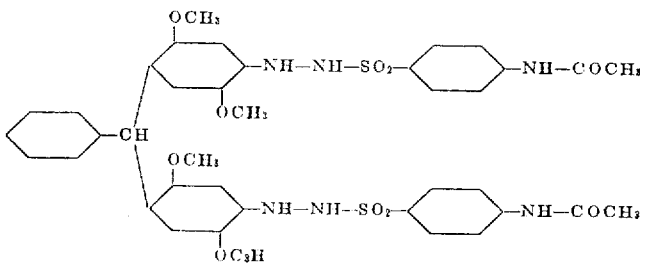

11. β,β'-Di- (methanesulfonyl)-4,4'- dihydrazino-diphenyl ether.

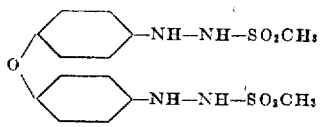

12. β,β'- Di- (4- acetamidobenzenesulfonyl)- 4,4'-dihydrazino-diphenyl ether.

13. β,β'-Di-(ethanesulfonyl)-4,4'-biphenylenehydrazine.

The bis-β-aromatic sulfonhydrazides may be prepared by one of two methods. The first involves the reaction of a diazonium compound with an organic sulfinic acid and reduction of the diazo-sulfone thereby obtained, and the second involves the reaction of an organic hydrazine with an organic sulfonyl chloride. The organic sulfonyl chlorides may be readily produced by the chlorsulfonation of the desired organic compound, or by the action of phosphorus pentachloride on salts of the desired organic sulfonic acids. The organic sulfinic acids, on the other hand, are produced by reduction of the organic sulfonyl chlorides.

The β-arylsulfonhydrazides after oxidation to the diazo sulfones may be coupled with any of the usual azo dye coupling components such as aromatic compounds containing directing groups, i. e., phenolic hydroxy, alkoxy, amino and the like and possessing replaceable hydrogen atoms in the coupling position which is ortho or para to the directing group or with compounds possessing a reactive methylene group. Examples of such coupling components are β-naphthol, N-(β-naphthyl)-3-hydroxy-2-naphthamide, G-salt, H-acid, K-acid, gamma acid, 2-hydroxy-3-naphthoic acid anilide, acetoacetanilide, 1-phenyl-5-pyrazolone, and the like.

It is of course understood that by a choice of suitable components, it is possible to secure azo dyes having a wide color range.

The following examples, in which the parts are by weight, further illustrate the invention:

EXAMPLE I

*β,β'-Di[4-(β''-sulfoethoxy)-benzenesulfonyl]-4,4'-dihydrazinodiphenylmethane*

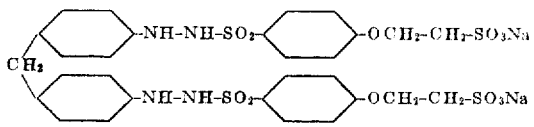

A suspension of 1.98 parts of 4,4'-diaminodiphenylmethane in 3.7 parts of formic acid, 4.8 parts of conc. hydrochloric acid and 10 parts of water is tetrazotized with a solution of 1.40 parts of sodium nitrite in 5 parts of water. The filtered diazonium salt solution is poured into a solution of 6.2 parts of disodium salt of β-(p-sulfinophenoxy)-ethanesulfonic acid in 10 parts of water. Eighty parts of absolute ethanol are added, and the precipitated diazosulfone is removed by filtration and washed with absolute ethanol and acetone and dried. The product, 4,4' - diphenyl - methane - bis - diazo - [4 - (β'-sulfoethoxy)-phenyl]-disulfone, amounts to 7.0 parts.

A solution of 1.99 parts of the diazosulfone in 25 parts of dimethyl formamide and 1.2 parts of glacial acetic acid is reduced with zinc dust in the usual manner. The zinc salts are removed by filtration and the filtrate diluted with 80 parts of acetone. The sulfonhydrazide is removed by filtration and washed with acetone. After drying, 1.3 parts of the product are obtained.

EXAMPLE II

*β,β'-Di[4-(β''-sulfoethoxy)-benzenesulfonyl]-3,3-dimethoxy-4,4'-dihydrazino-diphenylmethane*

The procedure is the same as in Example I excepting that the 4,4'-diamino-diphenylmethane is replaced by an equivalent amount of 3,3'-dimethoxy-4,4'-diamino-diphenylmethane.

EXAMPLE III

*β,β'-Di(4-acetamidobenzenesulfonyl)-4,4'-dihydrazino-diphenylmethane*

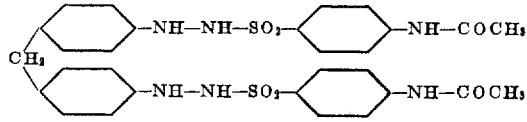

A solution of 3.96 parts of 4,4'-diaminodiphenylmethane in 7.3 parts of formic acid, 9.6 parts of conc. hydrochloric acid and 50 parts of water is tetrazotized with an aqueous solution containing 2.8 parts of sodium nitrite. The excess nitrous acid is destroyed with sulfamic acid and the filtered diazonium salt solution is poured into a solution of 8.4 parts of p-acetamidobenzene-sulfinic acid and 2.7 parts of sodium carbonate monohydrate in 50 parts of water. The diazosulfone is removed by filtration, washed well with water and air dried. The product, 4,4' - diphenylmethane - bis - diazo - (4 - acetamidophenyl)-disulfone, amounts to 10.5 parts.

A solution of the above diazosulfone in 50 parts of dimethyl formamide and 5.3 parts of glacial acetic acid is reduced in the usual manner with zinc dust. The zinc salts are removed by filtration and the filtrate poured into water. The sulfonhydrazide is removed by filtration and washed well with water. After air drying, the product amounts to 8.2 parts.

EXAMPLE IV

*β,β'-Di(4-acetamido-benzenesulfonyl)-4,4'-dihydrozinodiphenyl ether*

The procedure is the same as in Example III, excepting that the 4,4'-diamino-diphenylmethane is replaced by an equivalent amount of 4,4'-diamino-diphenyl ether.

EXAMPLE V

*β,β'-Di-(4-acetamidobenzenesulfonyl)-3,3'-dimethoxy-4,4'-biphenylene dihydrazine*

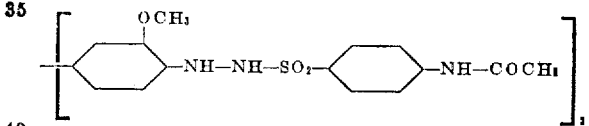

A solution of 3.17 parts of dianisidine dihydrochloride in 6 parts of formic acid and 25 parts of water was tetrazotized with a solution of 1.44 parts of sodium nitrite in 10 parts of water. The excess nitrous acid was destroyed with sulfamic acid and the filtered diazonium salt solution was poured into a solution of 4.0 parts of p-acetamidobenzenesulfinic acid and 1.24 parts of sodium carbonate monohydrate in 25 parts of water. The diazo-sulfone was removed by filtration, washed well with water and dried in a vacuum desiccator over phosphorus pentoxide. The yield amounts to 5.4 parts (81%) of 3,3'-dimethoxy - 4,4'-biphenyl-bis-diazo-(4-acetamidophenyl)-disulfone.

A solution of 5.0 parts of 3,3'-dimethoxy-4,4'-biphenyl-bis-diazo -(4-acetamidophenyl) - disulfone in 35 parts of dimethyl formamide and 2.1 parts of glacial acetic acid was reduced in the usual manner with zinc dust. The zinc salts were removed by filtration and the filtrate was poured into 100 parts of water. The sulfonhydrazide was removed by filtration, washed well with water and dried in a vacuum desiccator over phosphorus pentoxide. The yield is 4.1 parts (82%).

EXAMPLE VI

*β,β'-Di[4-(β''-sulfoethoxy)-benzenesulfonyl]-3,3'-dimethoxy-4,4'-biphenylene dihydrazine*

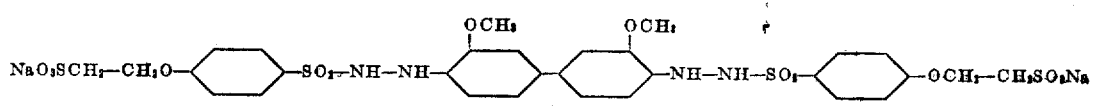

A solution of 100.5 parts of β-phenoxyethyl bromide (prepared by the method of "Organic Syntheses," Coll. vol. I (2nd Ed.), p. 436, note 6) in 500 parts of chloroform was cooled to 0° C. (ice salt bath) and treated with 250 parts of chlorosulfonic acid at such a rate that the temperature was not allowed to rise above 5° C. The addition of the first mole of chlorosulfonic acid was accompanied by a rapid rise in temperature and a copious evolution of hydrogen chloride. Although the remainder of the chlorosulfonic acid was added very rapidly, no appreciable rise in temperature was noted. The reaction mixture was poured into ice water and the chloroform layer was separated. The aqueous layer was extracted once with 50 parts of chloroform and the combined chloroform extract was washed once with 250 parts of cold water. After the chloroform solution had been dried over anhydrous sodium sulfate, the chloroform was removed by distillation (steam bath), and the liquid residue was digested with 240 parts of cold low-boiling petroleum ether. The solid was removed by filtration and dried in a vacuum desiccator over sodium hydroxide. The compound, 4-(β-bromethoxy)-benzenesulfonyl chloride, amounted to 124 parts (82% yield) and melted at 65° C.

To a well-stirred suspension of 120.0 parts of finely powdered 4-(β-bromethoxy)-benzenesulfonyl chloride and 63.0 parts of anhydrous sodium sulfite in 1000 parts of water, there was added 10% sodium hydroxide solution at such a rate that the pH of the solution was maintained at 8–9. About 286 parts of 10% sodium hydroxide were required. After the mixture had been stirred for about 4 hours, all but 4.0 parts of the sulfonyl chloride had dissolved and the pH of the solution remained constant. The cooled, filtered solution was acidified with 83 parts of conc. hydrochloric acid, and the precipitated material was removed by filtration. The crude sulfinic acid was redissolved in 250 parts of 10% sodium carbonate solution and 1000 parts of water and was reprecipitated with 60 parts of conc. hydrochloric acid. The solid material was removed by filtration, washed with a small amount of cold water and dried on a porous plate. The compound, 4-(β-bromethoxy)-benzenesulfinic acid, amounted to 75 parts (71% yield) and melted between 80 and 90° C., depending on the rate of heating.

Sixty-six parts of 4-(β-bromethoxy)-benzenesulfinic acid were added to a solution of 16.0 parts of sodium carbonate monohydrate in 250 parts of water. When carbon dioxide was no longer evolved, 33.0 parts of anhydrous sodium sulfite were added and the whole was refluxed for 1.5 hours. The solution was concentrated to about half its volume and then treated with 320 parts of absolute ethanol. After the mixture had been allowed to remain in an ice bath for 1 hour, the product which separated was removed by filtration. The filter cake was washed once with a cold solution of 15 parts of water in 40 parts of absolute ethanol. The disodium salt of β-(4-sulfinophenoxy)-ethane sulfonic acid, after drying in an oven at 105° C., amounted to 64.0 parts (83% yield).

A warm solution of 3.17 parts of pure dianisidine dihydrochloride in 2.4 parts of formic acid and 15 parts of water was cooled to 5° C. and tetrazotized with 1.44 parts of sodium nitrite in 5.0 parts of water. The excess nitrous acid was destroyed with sulfamic acid and the filtered diazonium salt solution was poured into a solution of 6.5 parts of the disodium salt of β-(4-sulfinophenoxy)-ethanesulfonic acid in 10.0 parts of water. Eighty parts of absolute ethanol were added and the material, which separated, was removed by filtration. The compound, 3,3'-dimethoxy - 4,4'-biphenylene-bis-diazo-[4-(β''-sulfoethoxy)-phenyl] sulfone was digested with 80 parts of acetone and air dried. The yield is 6.8 parts (81%).

A solution of 2.1 parts of the above diazosulfone in 2.0 parts of water, 1.0 part of acetic acid and 25.0 parts of di-methyl-formamide was treated with zinc dust at room temperature until the color of the solution changed from a deep red to a faint orange. The zinc compounds were removed by filtration, and the filtrate was poured into 150 parts of cold acetone. The precipitate, β,β' - di[4-(β''-sulfoethoxy) - benzenesulfonyl]- 3,3' dimethoxy-4,4'-biphenylene dihydrazine, was removed by filtration and washed with acetone. The yield is 1.3 parts (62%).

EXAMPLE VII

*β,β'-Di(methane sulfonyl)-4,4'-dihydrazino diphenyl ether*

A mixture of 60 parts of the dihydrochloride of 4,4'-dihydrazino diphenyl ether, 46 parts of methane sulfonyl chloride, and 68 parts of sodium bicarbonate in 500 parts of ethyl ether was stirred for 1 hour at room temperature and finally refluxed for 2 hours on a steam bath. The cooled mixture is treated with 264 parts of low boiling petroleum ether and the precipitated material removed by filtration and washed with petroleum ether. The solid is digested twice at room temperature with dilute hydrochloric acid and finally washed with water and air dried.

It is to be understood that while the invention has been described in connection with the production of azo dye images, the compounds involved also have use in the formation of azo dyes on textiles in general. Furthermore, the products find use as components of pesticidal compositions, for example as insecticides.

The present application is in part a continuation of our application Serial No. 714,146, filed December 5, 1946, now U. S. Patent 2,513,826 and entitled "Aromatic Sulfonhydrazides."

We claim:

1. Bis-β-aromatic sulfonhydrazides of the following formula:

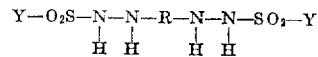

wherein both Y's are alike and are selected from the class consisting of lower alkyl, lower alkoxyphenyl, sulfo lower alkoxyphenyl, lower alkanoyl aminophenyl, benzoylaminophenyl, and aminophenyl radicals, and R is a divalent aromatic radical selected from the class consisting of those of the following structure:

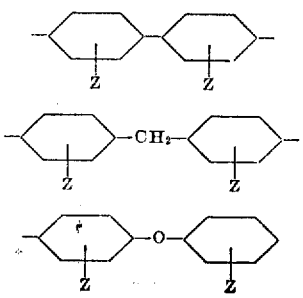

and

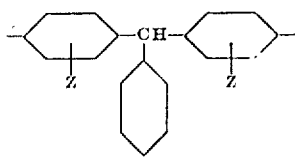

wherein the Z's are alike and are selected from the class consisting of hydrogen and lower alkoxy.

2. A β-aromatic sulfonhydrazide of the following formula:

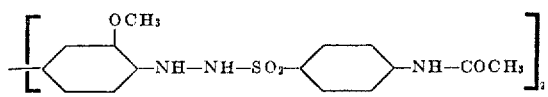

3. A β-aromatic sulfonhydrazide of the following formula:

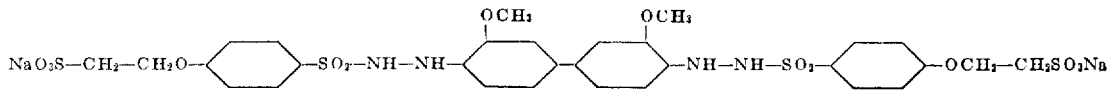

4. A β-aromatic sulfonhydrazide of the following formula:

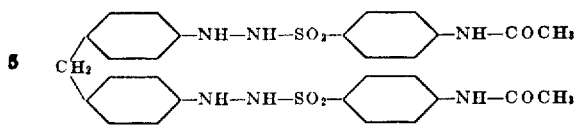

5. A β-aromatic sulfonhydrazide of the following formula:

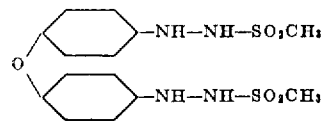

6. A β-aromatic sulfonhydrazide of the following formula:

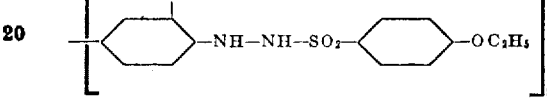

JOSEPH A. SPRUNG.
WILLY A. SCHMIDT.

REFERENCES CITED

The following references are of record in the file of this patent:

UNITED STATES PATENTS

| Number | Name | Date |
|---|---|---|
| 2,413,224 | Fox | Dec. 24, 1946 |
| 2,424,256 | Schmidt et al. | July 22, 1947 |
| 2,513,826 | Sprung et al. | July 4, 1950 |

FOREIGN PATENTS

| Number | Country | Date |
|---|---|---|
| 613,782 | Great Britain | Dec. 2, 1948 |

OTHER REFERENCES

Bell: "J. Chem. Soc. (London)," 1936, pp. 1242–1244.